US010713018B2

(12) United States Patent
Hertenstein et al.

(10) Patent No.: US 10,713,018 B2
(45) Date of Patent: Jul. 14, 2020

(54) INTERACTIVE VIDEO PLAYER COMPONENT FOR MASHUP INTERFACES

(75) Inventors: David Hertenstein, Coppell, TX (US); Joshua L. Purcell, Coppell, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1081 days.

(21) Appl. No.: 12/632,406

(22) Filed: Dec. 7, 2009

(65) Prior Publication Data
US 2011/0138354 A1 Jun. 9, 2011

(51) Int. Cl.
| | |
|---|---|
| *G06F 9/44* | (2018.01) |
| *G06F 8/38* | (2018.01) |
| *G06F 3/048* | (2013.01) |
| *G06F 9/451* | (2018.01) |

(52) U.S. Cl.
CPC .............. *G06F 8/38* (2013.01); *G06F 3/048* (2013.01); *G06F 9/451* (2018.02)

(58) Field of Classification Search
CPC ......... H04L 12/2809; G06F 8/38; G06F 8/44; G06F 9/44; G06F 3/00; G06F 3/048; G06F 9/451; G06F 9/45516
USPC ....................................................... 715/234
See application file for complete search history.

(56) References Cited

U.S. PATENT DOCUMENTS

| | | | | |
|---|---|---|---|---|
| 7,502,833 | B2 * | 3/2009 | Schaeck ................ | G06F 16/958 709/217 |
| 8,788,954 | B2 * | 7/2014 | Lemay ................ | G06F 16/9577 715/763 |
| 2002/0169852 | A1 * | 11/2002 | Schaeck ................ | G06F 16/958 709/218 |
| 2004/0090969 | A1 * | 5/2004 | Jerrard-Dunne ...... | G06F 16/954 370/395.54 |
| 2008/0040426 | A1 * | 2/2008 | Synstelien ............ | G06F 9/4443 709/203 |
| 2008/0098296 | A1 * | 4/2008 | Brichford ................ | G06F 3/14 715/234 |
| 2008/0195692 | A1 * | 8/2008 | Hayosh ............. | G06F 17/30905 709/202 |

(Continued)

OTHER PUBLICATIONS

"QWidget Class Reference", 2008, pp. 1-83. Full Documentation available: http://doc.qt.nokia.com/4.4/classes.html.*

(Continued)

*Primary Examiner* — Maikhanh Nguyen
(74) *Attorney, Agent, or Firm* — Cuenot, Forsythe & Kim, LLC

(57) ABSTRACT

A mashup widget can include a widget component and a widget container. The widget container can be graphically rendered within widget defined boundaries of a mashup application. The widget component can detect an externally defined video file. The video file can have a native frame size, which is a frame size at which the video file is encoded. The video file can be loaded from a remote data source over an IP network. The native frame size of the video file can be determined. The defined boundaries of an embedded multimedia application can be dynamically adjusted to the native size. The defined boundaries of the widget container can be resized to accommodate the adjusted embedded multimedia application. The video can be rendered and presented within in the adjusted widget container.

14 Claims, 4 Drawing Sheets

(56) References Cited

U.S. PATENT DOCUMENTS

| | | | |
|---|---|---|---|
| 2008/0201650 A1* | 8/2008 | Lemay | G06F 16/9577 715/763 |
| 2008/0222658 A1* | 9/2008 | Allen et al. | 719/320 |
| 2008/0294998 A1* | 11/2008 | Pyhalammi et al. | 715/748 |
| 2008/0295164 A1* | 11/2008 | Steiner | H04L 63/10 726/14 |
| 2009/0049384 A1 | 2/2009 | Yau | |
| 2009/0064005 A1 | 3/2009 | Cunningham et al. | |
| 2009/0064017 A1 | 3/2009 | Biniak et al. | |
| 2009/0144652 A1* | 6/2009 | Wiley | 715/800 |
| 2009/0254745 A1* | 10/2009 | Ganesan | H04L 63/06 713/151 |

OTHER PUBLICATIONS

"YouTube Blog", 2008, p. 1. Available at: http://youtube-global.blogspot.com/2008/10/link-to-best-parts-in-your-videos.html.*

"IWidget Programming Guide Version 1.0", Oct. 20, 2008, pp. 1-37.*

"IWidget Specification version 1.0", Sep. 9, 2008, pp. 1-38.*

"IWidget Specification Primer Version 1.0", Aug. 28, 2008, pp. 1-15.*

Jin et al. "Web services development methodology using the mashup technology," International Conference on Smart Manufacturing Application, 2008, pp. 559-562.*

Yu et al. "Understanding Mashup Development", IEEE Internet Computing, Sep.-Oct. 2008, pp. 44-55.*

Rosson et al. "What's in a mashup? And why? Studying the perceptions of web-active end users," 2008 IEEE Symposium on Visual Languages and Human-Centric Computing, 2008, pp. 31-38.*

Wang et al. , "A Mashup Platform for Lightweight Application Integration," 2009 International Conference on New Trends in Information and Service Science, Beijing, 2009, pp. 27-32.*

Adobe, "Flex 2 Programming ActionScript 3.0", 2006 Adobe Systems Incorporated, 524 pages.*

Gonzalez, "Quick Embed Code to Add Comments to Any Site", Nov. 29, 2006, 8 pages.*

"Papervision 3d, version 2.0", [online] [retrieved Dec. 7, 2009] retrieved from the Internet: <http://code.google.com/p/papervision3d/>.

Fernando, Z., et al., "Tweener", [online] [retrieved Dec. 7, 2009] retrieved from the Internet: <http://code.google.com/p/tweener/>.

* cited by examiner

Example VTWC Instantiation 400

```
405  <object classid="clsid:D27CDB6E-AE6D-11cf-96B8-444553540000" id="VideoTask"
     width="100%" height="100%" codebase="http://download.macromedia.com/pub/
     shockwave/cabs/flash/swflash.cab">

410      <param name="movie" value="/Reviewer/iWidget/widgets/videoTask/
                                      IBM_IWF_VideoTask.swf" />
         <param name="quality" value="high" />
         <param name="allowScriptAccess" value="always" />
         <param name="scale" value="noscale" />
         <param name="salign" value="tl" />
         <param name="wmode" value="opaque" />
         <param name="FlashVars" value="width=800&height=450" />
         <param name="bgcolor" value="#333333" />
         <param name="align" value="middle" />
                                                                          420
415      <embed src="/Reviewer/iWidget/widgets/videoTask/IBM_IWF_VideoTask.swf"
     FlashVars="width=800&height=450" bgcolor="#333333" wmode="opaque" salign="tl"
     quality="best" width="100%" height="100%" name="VideoTask" align="middle"
     play="true" loop="false" quality="best" scale="noscale" allowScriptAccess="always"
     allowFullScreen="true" type="application/x-shockwave-flash" pluginspage="http://
     www.macromedia.com/go/getflashplayer">
         </embed>
     </object>
```

FIG. 4

INTERACTIVE VIDEO PLAYER COMPONENT FOR MASHUP INTERFACES

REFERENCE TO COMPUTER PROGRAM LISTING

The present application includes a computer program listing referred to as Appendix A which is being submitted electronically in accordance with MPEP § 1.96(c) via EFS-Web filing interface. The referenced computer program listing, Appendix A, is being submitted separately as an ASCII .txt file. The computer program listing is entitled CHA9-2009-0016US1_Appendix_A.txt, and is incorporated herein by reference.

BACKGROUND

The present invention relates to the field of Web 2.0 applications and, more particularly, to an interactive video player component for mashup interfaces.

With the wealth of information sources available within organizations and on the Internet, the use of mashups to correlate and present data is rising in popularity. A mashup is a type of Web interface/application designed to combine data and/or functional components from two or more user-specified sources into a new data set/application. For example, a Chicago Incident Map is a mashup that correlates incident data from the Chicago Police Department with cartographic data to provide users with a variety of location-based incident statistics.

While mashups have been quite successful in terms of data aggregation, component aggregation has highlighted a variety of shortcomings. The use of a video player component is one such obstacle. Current approaches for incorporating a video player component within a mashup provide the user with a static viewer for a preset video without the ability to access and play user-selected video files. When the video player component loads, only the videos specified within the mashup are accessible to the user. The user is unable to play a video file that is externally-located to the mashup.

Further, there are issues regarding implementation of a video player component within a mashup. Many current implementations embed a commercial software video player, such as QUICKTIME or REALPLAYER, within the mashup. In addition to being a static video player, the use of an embedded video player requires the installation of the Web browser plugin on the user's local system as well as version management (downloading/updating) of the plugin.

Another approach is to forego the embedded video player component and simply provide a runtime-generated hyperlink to the video file. When the user clicks on the hyperlink, the video file is then presented in a compatible video player application installed on the user's device. In addition to the static nature of the hyperlink, the user is still stuck with using a proprietary video player application. Further, if the user does not have a video player application or one that is compatible with the video file, this approach renders the video player component of the mashup useless.

BRIEF DESCRIPTION OF THE SEVERAL VIEWS OF THE DRAWINGS

FIG. 4 is a code excerpt for an example instantiation of the video task iWidget component (VTWC) in accordance with embodiments of the inventive arrangements disclosed herein.

DETAILED DESCRIPTION

Figure 1:
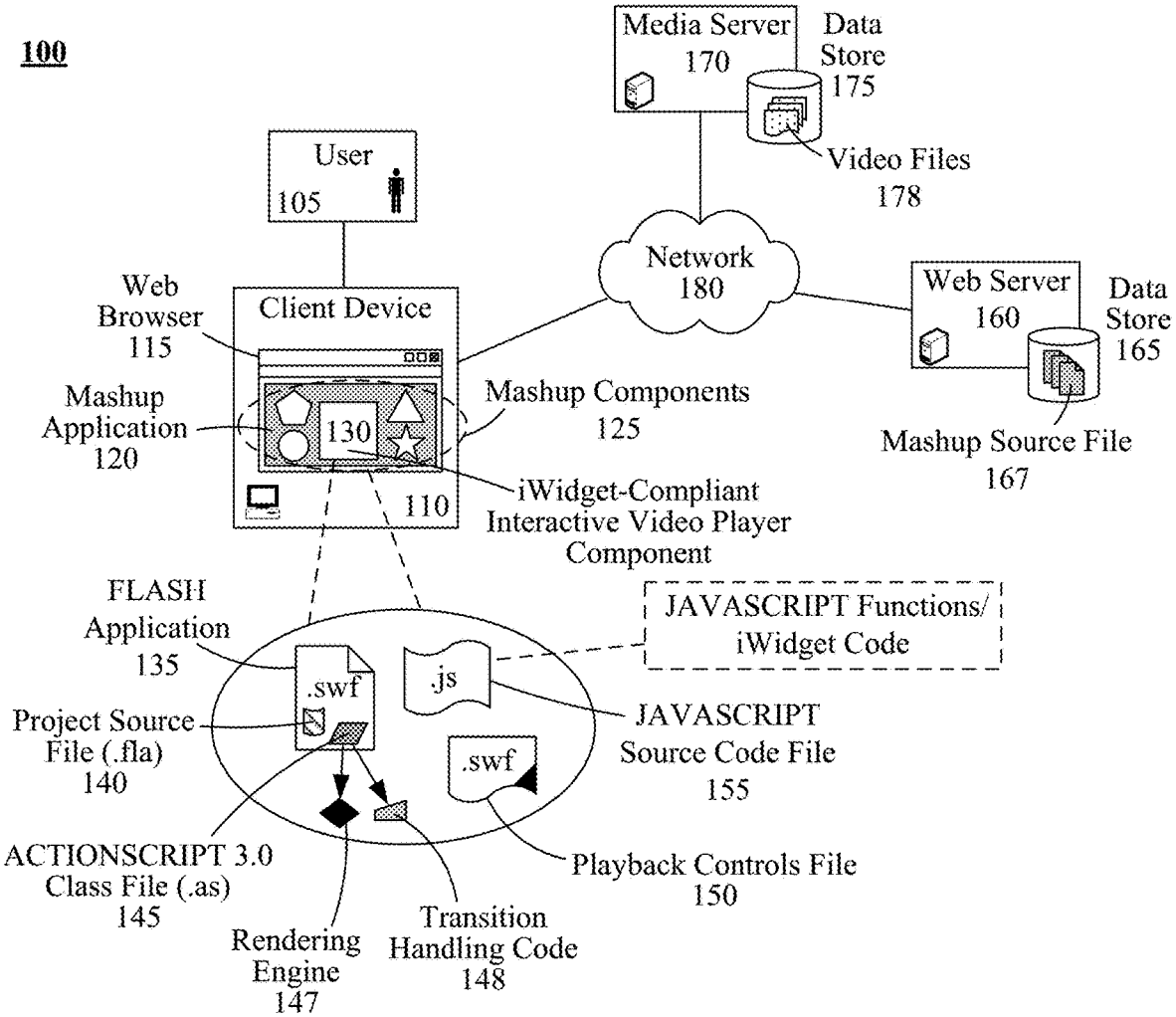
FIG. 1 is a schematic diagram illustrating a system that utilizes an iWidget-compliant interactive video player component within a mashup application in accordance with embodiments of the inventive arrangements disclosed herein.

The present invention discloses an iWidget-compliant interactive video player component for mashup applications/interfaces. The iWidget-compliant interactive video player component can allow a user to select and play video files not preloaded by the mashup application. Further, the iWidget-compliant interactive video player component can include additional interactive functionality, such as comment logging and dynamic display resizing, currently not available in conventional video player components. To achieve this, the iWidget-compliant interactive video player component can be designed as a FLASH application that can utilize an ACTIONSCRIPT 3.0 class file to execute dynamic functionality defined in a JAVASCRIPT source file. The FLASH application can then be embedded within the source file of an iWidget-based mashup application.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction implementation system. For the purposes of this description, a computer-usable or computer-readable medium can be any apparatus that can contain, store, communicate, propagate, or transport the program for use by or in connection with the instruction implementation system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM) or FLASH memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a local area network (LAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as JAVA, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or running program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during runtime.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that utilizes an iWidget-compliant interactive video player component 130 within a mashup application 120 in accordance with embodiments of the inventive arrangements disclosed herein. In system 100, the user 105 can utilize the iWidget-compliant interactive video player component 130 within the mashup application 120 to access and play video files 178 from an independent media server 170.

The mashup application 120 can be accessed by the user 105 using a Web browser 115 application running on a client device 110. The client device 110 can represent a variety of electronic computing devices capable of supporting the mashup components 125 of the mashup application 120 and communicating with Web 160 and media 170 servers over the network 180.

As used herein, the term "mashup application" is broadly used to refer to mashups that are created using one or more standardized Web-compatible programming languages and/or technologies that conform to an extensible browser-based component model, such as the iWidget specification. As such, the mashup source file 167 corresponding to the mashup application 120 rendered within the Web browser 115 on client device 110 can be represented by a Web page file (.HTML, .XML, .ASP, etc.) or a Web-executable file (.EXE, .SWF, .PHP, etc.). Either representation can be expanded to include various combinations of additional Web-based languages and/or technologies that support its mashup components 125.

Since the mashup application 120 is Web-based, a Web server 160 can be used to provide the user 105 with access to a data store 165 containing the mashup source file 167. The mashup source file 167 can define the overall presentation and functionality of the mashup application 120 and the mashup components 125, as well as the supporting data sources.

A mashup component 125 can represent a variety of processing and/or presentation elements utilized by the mashup application 120. Depending on the architecture of the mashup application 120, the programming code supporting the mashup component 125 can be run either within the Web browser 115 on the client device 110 or by the Web server 160 prior to presentation within the Web browser 115.

Stated differently, a mashup application 120 can contain a mixture of content or elements that combines data from more than one resource (or source) into a single integrated product. Mashups permit an interpretation of one set of data from a first resource in a context of another set of data from a separate resource, where different results are generated based upon resource dependencies. For example, a mashup application 120 can graphically present a map of showing a set of addresses by interpreting addresses formatted grammatically in a first resource in a context of a second set of resources that interpret addresses as a set of map points on a visual map. A mashup application 120 can include a set of views, which are able to be overlaid, such as overlaying points of interest determined from one content source (e.g., a first resource) overtop of mapping data from a different content source (e.g., a second resource). Mashups are often considered a type of Web 2.0 object that is used to consolidate information from multiple sources into a single easy-to-use interface.

It is important to note that the mashup application 120 and mashup components 125 function in a Web 2.0 environment. That is, the data presented by the mashup application 120 within the Web browser 115 can dynamically change in response to changes in the corresponding data sources; each mashup component 125 can be updated asynchronously and independently. For example, the data presentations provided by Chicago Incident Map can update in near-realtime to reflect new data entered into the data system of the Chicago Police Department.

The iWidget-compliant interactive video player component 130 can be a mashup component 125 used within the mashup application 120 to provide the user 105 with the ability to access video files 178 that are not incorporated into the mashup application 120. Further, the iWidget-compliant interactive video player component 130 can allow for user-customizations and functionality not currently available from proprietary video player plugin components.

It should be emphasized that conventional video player components utilized within mashup applications 120 lack user interaction and customization. That is, current mashup applications 120 can only provide the user 105 with a static video player.

To achieve this level of interactivity, the interactive video player component 130 can be architected as a FLASH application 135 that utilizes an ACTIONSCRIPT 3.0 class file 145 as an intermediary to access dynamic JAVASCRIPT functions contained in a JAVASCRIPT source code file 155.

As illustrated in system 100, the iWidget-compliant interactive video player component 130 can include a FLASH application 135 (.SWF), a JAVASCRIPT source code file 155 (.JS), and a playback controls file 150 (.SWF). The FLASH application 135 can include a project source file 140 (.FLV) and an ACTIONSCRIPT 3.0 class file 145 (.AS). The project source file 140 can define the standard FLASH components and basic object controls for the FLASH application 135 as well as outline the functional flow. For example, the project source file 140 can contain the FLV-Playback component, FLASH-based menu control objects, text input object used for debugging, and the like.

The ACTIONSCRIPT 3.0 class file 145 can define the video widget of the interactive video player component 130. The ACTIONSCRIPT 3.0 class file 145 can include multiple public functions that can be programmatically exposed to the JAVASCRIPT source code file 155 to provide FLASH-to-JAVASCRIPT communication. In addition to internal functions, the ACTIONSCRIPT 3.0 class file 145 can be configured to utilize the functions of a rendering engine 147, such as PAPERVISION3D, and transition handling code 148 such as TWEENER. The public functions of class file 145 can include:

loadVideo function for loading a video into the FLASH application 135 directly using a URL path string loadXML function taking an XML object and node identifier string as arguments, wherein the loadXML function uses the node identifier strings to pull a value of the corresponding node from the XML object loadSkinPath function taking a URL to a pre-compiled playback controls file getURLSource function for returning a path string for a source video file 178 that is currently loaded loadBackground function taking a URL path string for an image file, wherein said loadBackground function loads the file into a background layer of a video player playVideo function for playing a video loaded into component 130 starting at a current playhead location resetVideo function for clearing any currently loaded video and to return the component 130 to its default state and sizing setVideoWH function taking width and height values, wherein said setVideoWH applies the width and height values to dimensions of the widget defined boundaries of the component 130 after executing an algorithm to modify the width and height values to maintain the loaded video file's aspect ratio addComment function for making visible and initializing an interface for adding comments to the loaded video file showFullScreen function for making component 130 execute in full screen mode taking over an entire visible area of an end-user's display showPrefWH function for resizing the widget defined boundaries of the component 130 to a width and height from the loaded video file showDefaultWH function for resizing the widget defined boundaries of the component 130 to default widget container dimensions The playback controls file 150 can encapsulate user-selectable operations that can alter the playback of the video file 178 within the iWidget-compliant interactive video player component 130. Examples of controls that can be expressed within the playback controls file 150 can include, but are not limited to, a pause video control, a reverse play control, a forward play control, a stop play control, as well as speed variations of such controls (e.g., 2× reverse play speed, 4× reverse play speed, etc.).

The JAVASCRIPT source code file 155 can include JAVASCRIPT functions and iWidget code elements that implement the dynamic and interactive operation of the interactive video player component 130. Example operations provided by the JAVASCRIPT source code file 155 can include, but are not limited to, dynamically loading/reloading video files 178, dynamically resizing the iWidget-compliant interactive video player component 130, changing the presented resolution of the video file 178, a dynamic comment logging system for a video file 178, a set of user-customizable user interface controls, and the like.

Using this software architecture and the specific code, such as the example code contained within Appendix A, the iWidget-compliant interactive video player component 130 can allow the user 105 to access, view, and manipulate a video file 178 loaded from the data store 175 of a media server 170.

In an alternate embodiment, the video file 178 can be contained within a data store (not shown) local to the client device 110.

Appendix A includes a further elaboration (i.e., provides a more robust implementation example of the elements of the iWidget-compliant interactive video player component 130) than shown in system 100. It is provided for illustrative purposes only and the specifics expressed in Appendix A are not to be construed as a limitation of the scope of the invention described herein. Appendix A is being submitted separately on a compact disc in accordance with MPEP § 1.96(c).

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

As used herein, presented data stores 165 and 175 can be a physical or virtual storage space configured to store digital information. Data stores 165 and 175 can be physically implemented within any type of hardware including, but not limited to, a magnetic disk, an optical disk, a semiconductor memory, a digitally encoded plastic memory, a holographic memory, or any other recording medium. Data stores 165 and 175 can be a stand-alone storage unit as well as a storage unit formed from a plurality of physical devices. Additionally, information can be stored within data stores 165 and 175 in a variety of manners. For example, information can be stored within a database structure or can be stored within one or more files of a file storage system, where each file may or may not be indexed for information searching purposes. Further, data stores 165 and/or 175 can utilize one or more encryption mechanisms to protect stored information from unauthorized access.

The client device 110, web server 160, and media server 170 can each be computing devices comprising hardware and one or more computer program products. The hardware can include a processor, volatile memory, non-volatile memory, and network transceiver communicatively linked via a bus. The computer program products can be stored in a storage medium and can contain instructions, which the processor is able to execute. Computer program products include software, firmware, and electronically implemented logic embedded in circuitry. As shown, web browser 115, mashup application 120, mashup components 125, component 130, and the like are all computer program products.

Figure 2:
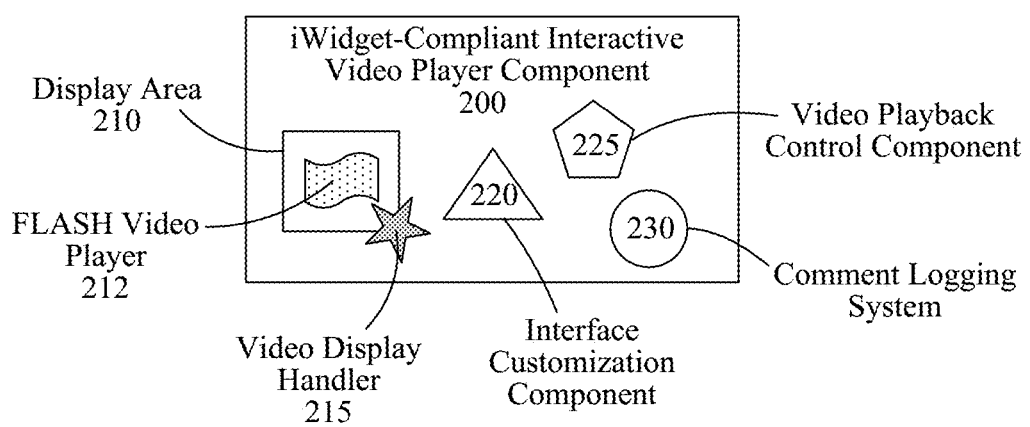
FIG. 2 is a functional component diagram of an iWidget-compliant interactive video player component in accordance with an embodiment of the inventive arrangements disclosed herein.

FIG. 2 is a functional component diagram of an iWidget-compliant interactive video player component 200 in accordance with embodiments of the inventive arrangements disclosed herein. The iWidget-compliant interactive video player component 200 can be utilized within the context of system 100 or any other iWidget-based mashup application.

In terms of functional operations, the iWidget-compliant interactive video player component 200 can include a display area 210, a video display handler 215, an interface customization component 220, a video playback control component 225, and a comment logging system 230. It should be noted that the functional components 210-230 are meant for illustrative purposes only and that additional functional components can be added without compromising the embodiment of the present invention.

The display area 210 can represent the distinct viewable area of the iWidget-compliant interactive video player component 200 in which a video file can be visually presented to a user. The video file can be presented by a FLASH video player 212 within the display area 210. The FLASH video player 212 can represent a FLASH-based software component accessible by the iWidget-compliant interactive video player component 200. That is, although a functional component of the iWidget-compliant interactive video player component 200, the FLASH video player 212 need not be a packaged component of the iWidget-compliant interactive video player component 200.

For example, the iWidget-compliant interactive video player component 200 can include code that determines the FLASH video players 212 already installed upon a client device running the iWidget-compliant interactive video player component 200 to utilize within the display area 210. The absence of an installed FLASH video player 212 can signal the iWidget-compliant interactive video player component 200 to initiate the download of a predefined default FLASH video player 212 from a network-accessible source.

The video display handler 215 can represent the functions of the iWidget-compliant interactive video player component 200 that can interact with the display area 210 and the FLASH video player 212. The video display handler 215 can support operations such as resizing the display area 210 and/or FLASH video player 212 and loading video files.

For example, the video display handler 215 can detect the native video resolution of a video file upon loading. The video display handler 215 can then resize and/or reposition the FLASH video player 212 within the display area 210 to accommodate the native resolution using JAVASCRIPT functions and a JAVASCRIPT animation engine such as DOJO. Further, the display area 210 can be simultaneously resized and/or repositioned within the Web browser to accommodate the changes of the FLASH video player 212 using ACTIONSCRIPT 3.0 class functions and a FLASH animation engine such as TWEENER. These actions can produce the visual effect of the FLASH video player 212 dynamically growing or shrinking to the native resolution of the loaded video file.

The interface customization component 220 can provide the user with customizable settings for the iWidget-compliant interactive video player component 200. The user-customized settings can be stored for subsequent uses of the iWidget-compliant interactive video player component 200 by the user. Depending upon the implementation, the interactive video player component 200 can store the customized settings local to the user's client device or in a server-side storage location associated with the user.

The video playback control component 225 can represent the functions that allow the user to manipulate playback of the video file within the display area 210. In addition to the manipulation functions, the video playback control component 225 can also describe the presentation of the controls within the iWidget-compliant interactive video player component 200.

The comment logging system 230 can represent an interface of the iWidget-compliant interactive video player component 200 that can provide the user with the ability to capture textual comments for user-specified time intervals of the video file. The captured comments can then be stored to a location designated by the user.

It should be noted that the functional components illustrated in FIG. 2 may not have a one-to-one correspondence with the source files associated with the iWidget-compliant interactive video player component 130 of system 100. That is, the functionality provided by the video display handler 215 can require the use of code from both the ACTION-SCRIPT 3.0 class file 145 and the JAVASCRIPT source code file 155.

Figure 3:
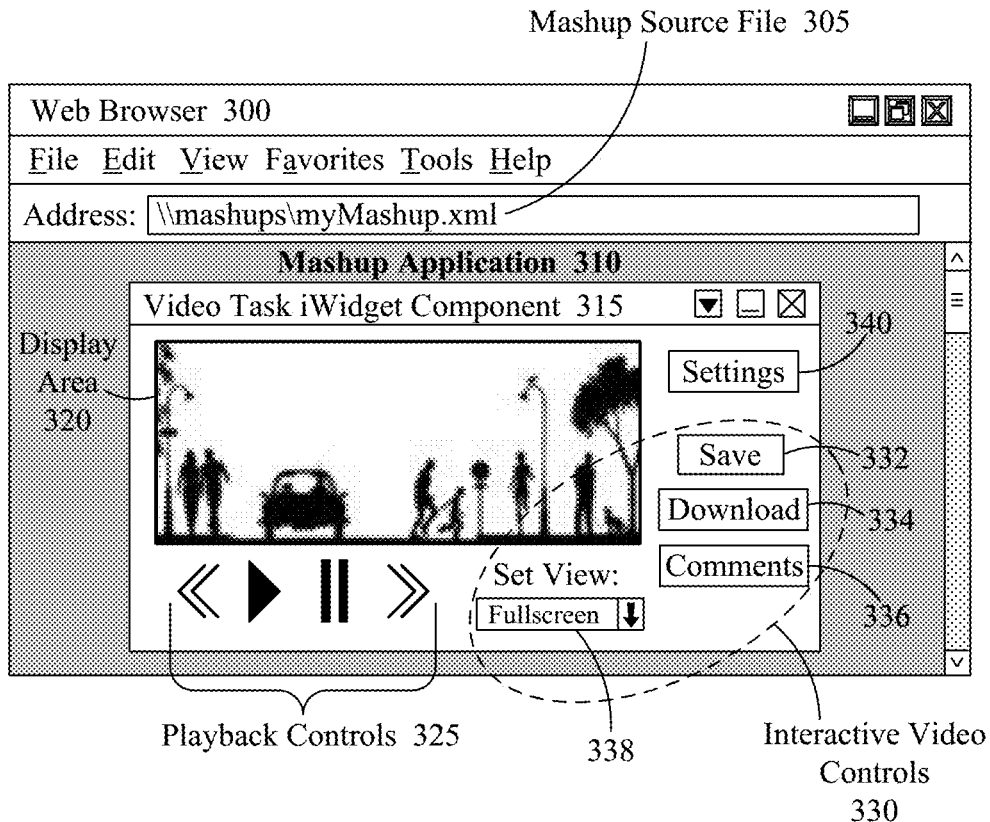
FIG. 3 is an illustration of a Web browser displaying the video task iWidget component of a mashup application in accordance with an embodiment of the inventive arrangements disclosed herein.

FIG. 3 is an illustration of a Web browser 300 displaying the video task iWidget component 315 of a mashup application 310 in accordance with embodiments of the inventive arrangements disclosed herein. The video task iWidget component 315 can be utilized within the context of system 100 and/or express the functional components of FIG. 2.

It is important to note that the interface of the video task iWidget component 315 shown in FIG. 3 is for illustrative purposes only, and is not intended to present an exhaustive embodiment of the present invention.

The Web browser 300 can allow the user to launch the mashup application 310 via a network address or uniform resource locator (URL) to the corresponding mashup source file 305. Running of the mashup source file 305 can render the mashup application 310 within the viewable area of the Web browser 300.

The mashup application 310 can include a video task iWidget component (VTWC) 315. Rendering of the VTWC 315 can include presentation of a display area 320, playback controls 325, interactive video controls 330, and a settings button 340. The display area 320 can represent the area of the VTWC 315 in which a video file can be visually presented.

The playback controls 325 can represent user-selectable buttons that can allow the user to manipulate playback of the video file within the display area 320. As shown in this example, the playback controls 325 can include functions to rewind, play, pause, and fast-forward the playback of the video file.

The settings button 340 can provide the user with an interface through which the presentation of elements and/or default settings for the VTWC 315 can be customized. For example, the user can designate that video files should be presented in their native resolution, or a default file path for storing video files.

A variety of functions can be presented for use by the user via the interactive video controls 330. In this example, the interactive video controls 330 can include a save button 332, a download button 334, a comments button 336, and a set view mechanism 338. The save button 332 can allow the user to store a copy of the displayed video file in a designated location.

The download button 334 can allow the user to access a video file to play within the display area 320 of the VTWC 315. It should be emphasized that the video file accessed using the download button 334 is not a precompiled element of the mashup application 310. That is, the video file is downloaded in real-time and in response to the user selection of the download button 334. Conventional video player components implemented with mashup applications 310 require explicit declaration of the video files within the mashup source file 305, whereas the VTWC 315 does not.

Figure 3A:
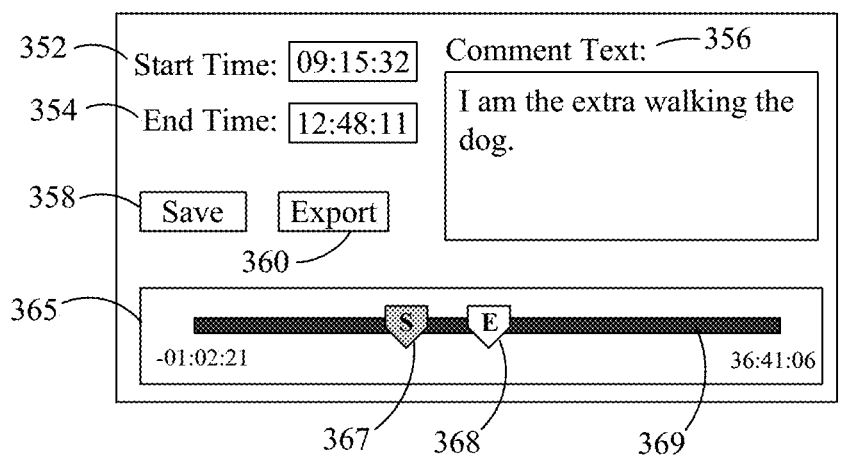
FIG. 3A is an illustration of an example comment capture window.

The user can use the comments button 336 to launch an interface similar to the example comment capture window 350 of FIG. 3A for managing textual comments for the video file being presented. As shown in FIG. 3A, the example comment capture window 350 can present the user with various input mechanisms to capture the relevant data elements for creating/modifying comments to the video file.

The relevant data elements captured by the example comment capture window 350 can include a start time 352, an end time 354, and comment text 356. These data elements can be implemented in a variety of ways that can be supported by the VTWC 315, such as the text fields shown in this example.

Since it is unlikely that a user will know the precise start time 352 and end time 354 of a segment, the example comment capture window 350 can include a visual time set control 365. The visual time set control 365 can include two adjustable slider tabs 367 and 368 that can be positioned upon a timing bar 369 that represents the time duration of the loaded video file. One slider tab 367 can correspond to the start time 352, while the other slider tab 368 can correspond to the end time 354. A variety of methods can be utilized to distinguish between the two slider tabs 367 and 368, such as the labeling and shading difference shown in the example comment capture window 350.

Adjustments to a slider tab 367 or 368 along the timing bar 369 can correspondingly change the presented image of the video file within the display area 320 as well as the values of their associated data elements 352 and 354. For example, moving the end slider tab 368 to the right along the timing bar 369 can perform a fast-forwarding function upon the presented video file and increase the value of the end time 354.

The example comment capture window 350 can also include a save button 358 and an export button 360. The save button 358 can initiate the storage of the data inputted into the example comment capture window 350. The VTWC 315 can store the data values representing the comment as a local data object.

The export button 360 can allow the user to export their locally-stored comment data objects to a location external to the client device running the VTWC 315. As part of the export process, the VTWC 315 can create an aggregate of comment data objects and generate metadata for the video file. For example, a user can use the export button 360 to export their comments of a video file to a server of YOU-TUBE for other users to view.

In an alternate embodiment, the comment text 356 can be presented synchronously within the VTWC 315.

The set view mechanism 338 can represent the means by which the user can select and/or change the viewing resolution of the video presented within the display area 320. As shown in this example, the set view mechanism 338 can be a pull-down menu containing the supported viewing resolutions.

It should be noted that the functionalities of the interactive video controls 330 and the settings button 340 can be implemented within the VTWC 315 in ways other than shown in FIG. 2. For example, these elements can be presented as menu items of a right-click context menu instead of visual buttons.

FIG. 4 is a code excerpt for an example instantiation 400 of the video task iWidget component (VTWC) in accordance with an embodiment of the inventive arrangements disclosed herein. The example VTWC instantiation 400 can be utilized within the context of system 100 and/or to present the graphical user interface (GUI) shown in FIG. 3.

It should be appreciated that the example VTWC instantiation 400 is for illustrative purposes only and that other instantiations can be possible based upon the implementation of the VTWC and/or mashup application.

The example VTWC instantiation 400 can be utilized within the context of a hypertext markup language-based (HTML-based) mashup source file. An OBJECT tag 405 can be used to indicate to the Web browser that a media object defined by the OBJECT tag's 405 attributes, such as ID and CODEBASE, is to be rendered by the Web browser. A set of runtime parameter tags 410 can be included for the OBJECT tag 405.

With the OBJECT tag 405 creating the page space, an EMBED tag 415 can be used to instantiate the VTWC. As shown in this example, the SOURCE attribute 420 can contain the URL or path location of the VTWC. Additional attributes can also be included within the EMBED tag 415 to define additional presentation parameters for the VTWC.

It should be noted that use of the additional presentation parameters of the EMBED tag 415 do not enable or hinder the interactive functionality of the VTWC. That is, the interactive functionality of the VTWC can be independent of the approach used for instantiation of the VTWC within the mashup application.

Appendix A includes a further elaboration (i.e., provides a more robust code example of the example VTWC instantiation 400) than shown in FIG. 4. It is provided for illustrative purposes only and the specifics expressed in Appendix A are not to be construed as a limitation of the scope of the invention described herein. Appendix A is being submitted separately on a compact disc in accordance with MPEP § 1.96(c).

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of displaying a video file within a browser of a client computer, comprising:
    receiving, by the client computer from a web server, a mashup source file;
    rendering, using the browser and the mashup source file, a mashup application;
    receiving, by the browser and independent of the mashup application, the video file; and
    accessing, using a video player component within the mashup application, the video file from a media server, wherein
    the video player component includes:
    a video player,
    scripting functions contained within a source code file, and
    an intermediary scripting class file used by the video player to access the scripting functions, and
    the mashup source file
    includes the video player,
    corresponds to the mashup application,
    defines overall presentation and functionality of the mashup application, and
    identifies supporting data sources for the mashup application,
    wherein
    the scripting functions include dynamically resizing the video player component, and
    the scripting functions include comment logging.

2. The method of claim 1, wherein the scripting functions include video playback control.

3. The method of claim 1, wherein the scripting functions includes interface customization.

4. The method of claim 1, wherein the scripting functions include dynamically loading and/or reloading of video files.

5. The method of claim 1, wherein the video player is packaged separately from the video player component.

6. A client computer configured to display a video file within a browser executing in the client computer, comprising:
    a processor configured to initiate the executable operations of:
    receiving, by the client computer from a web server, a mashup source file;
    rendering, using the browser and the mashup source file, a mashup application;
    receiving, by the browser and independent of the mashup application, the video file; and
    accessing, using a video player component within the mashup application, the video file from a media server, wherein
    the video player component includes:
    a video player,
    scripting functions contained within a source code file, and an intermediary scripting class file used by the video player to access the scripting functions, and the mashup source file
includes the video player,
corresponds to the mashup application,
defines overall presentation and functionality of the mashup application, and
identifies supporting data sources for the mashup application, and wherein
the scripting functions include dynamically resizing the video player component, and
the scripting functions include comment logging.

7. The client computer of claim 6, wherein the scripting functions include video playback control.

8. The client computer of claim 6, wherein the scripting functions includes interface customization.

9. The client computer of claim 6, wherein the scripting functions include dynamically loading and/or reloading of video files.

10. The client computer of claim 6, wherein the video player is packaged separately from the video player component.

11. A computer program product, comprising:
a storage hardware device having stored therein computer-usable program code for displaying a video file within a browser of a client computer,
the computer-usable program code, which when executed by the client computer, causes the client computer to perform:
receiving, by the client computer from a web server, a mashup source file;
rendering, using the browser and the mashup source file, a mashup application;
receiving, by the browser and independent of the mashup application, the video file; and
accessing, using a video player component within the mashup application, the video file from a media server, wherein the video player component includes:
a video player,
scripting functions contained within a source code file, and
an intermediary scripting class file used by the video player to access the scripting functions, and the mashup source file
includes the video player,
corresponds to the mashup application,
defines overall presentation and functionality of the mashup application, and
identifies supporting data sources for the mashup application, and wherein
the scripting functions include dynamically resizing the video player component, and
the scripting functions include comment logging.

12. The computer program product of claim 11, wherein the scripting functions include video playback control.

13. The computer program product of claim 11, wherein the scripting functions includes interface customization.

14. The computer program product of claim 11, wherein the scripting functions include dynamically loading and/or reloading of video files.

* * * * *